United States Patent Office 3,272,797
Patented Sept. 13, 1966

3,272,797
CYCLIC ACETALS AND KETALS OF THE 6α-METHYLPREGNANE SERIES AND PROCESS FOR PREPARING SAME
Sheila Mary Booker, Bernard Ellis, and Vladimir Petrow, all of London, England, assignors to The British Drug Houses Limited, London, England, a British company
No Drawing. Filed May 5, 1960, Ser. No. 26,979
Claims priority, application Great Britain, May 11, 1959, 16,117/59
12 Claims. (Cl. 260—239.55)

This invention is for improvements in or relating to the preparation of organic compounds and has particular reference to a new process for the preparation of cyclic acetals and ketals of the 6α-methylpregnane series, which are represented by Formula I below.

The cyclic acetals and ketals are of value on account of their marked progestational activity when administered by the oral route. In addition certain of them and in particular the ketal derived from acetone (I, R=R'=Me) have diuretic activity, a property which in conjunction with the marked progestational activity renders the product of particular value for the relief of premenstrual tension.

According to the present invention there is provided a process for the preparation of cyclic acetals and ketals of the 6α-methylpregnane series having the general formula

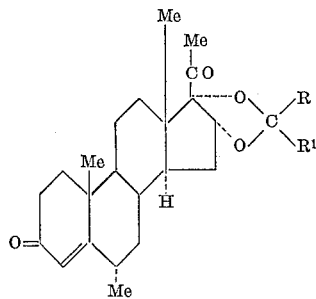

(where R is hydrogen or an alkyl or aryl group and R' is an alkyl or aryl group or where R and R' together from a ring) which process comprises oxidising a cyclic acetal or ketal having the general formula

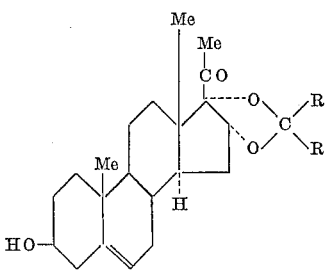

(where R and R' have the same meaning as above) with an organic peracid to form the corresponding 5α:6α-epoxide

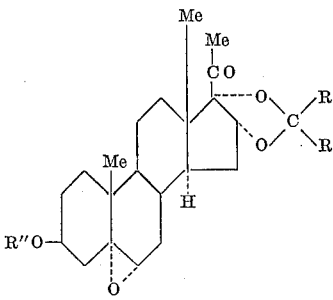

(where R"=H and R and R' have the same meaning as above), reacting the 5α:6α-epoxide with a methyl magnesium halide to give a 6β-methyl-3β:5α-diol having the formula

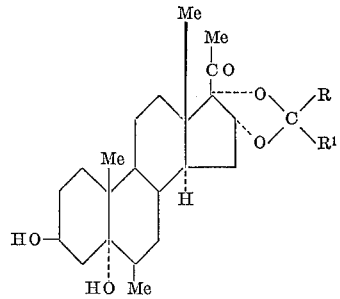

(where R and R' have the same meaning as above), oxidising the 6β-methyl-3β:5α-diol by means of an oxidising agent to form a 6β-methyl-3-ketone having the formula

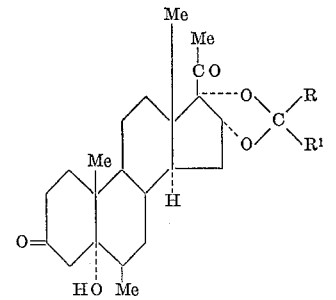

(where R and R' have the same meaning as above) and dehydrating and epimerising the resulting 6β-methyl-3-ketone.

The invention also provides the new compound 16α:17α - (2':2' - dimethyl - 4':5' - dioxolane) - 3β-hydroxypregn-5-en-20-one employed as starting material in the preparation of the progestationally active cyclic acetals and ketals formed by the process of the present invention.

The cyclic acetals and ketals (II) which form the starting point of the present invention may be readily prepared by condensation of 3β:16α:17α-trihydroxypregn-5-en-20-one with aldehydes or ketones by methods established by prior art and in particular by condensation in the presence of an acidic catalyst. Perchloric acid is the preferred catalyst. The condensation may be performed at room temperature employing a large excess of the aldehyde or ketone which acts as solvent or alternatively in the presence of an inert organic solvent such as benzene.

Oxidation of the cyclic acetal or ketal (II) into the corresponding 5α:6α-epoxide (III; R"=H) may be achieved by treating the compound (II) with an organic peracid such for example as peracetic acid, perbenzoic acid or monoperphthalic acid, in a solvent such as chloroform or ether, and purifying the resulting 5α:6α-epoxide by crystallisation.

Material produced in this way may be very sparingly soluble in the solvents employed in the next stage of the process, a difficulty which may be overcome by acylating the 3β-hydroxyl group by methods well known to those skilled in the art.

Reaction of the 5α:6α-epoxide (III; R"=H or acyl) with a methylmagnesium halide, preferably the bromide or iodide, may be accomplished by adding a solution of the epoxide in a solvent such as benzene to a solution of the Grignard reagent in a solvent such as ether, distilling off most of the lower-boiling component of the mixture, and refluxing for several hours. Thereafter the reaction product is isolated by methods well known to those skilled in the art, and purified.

It is a remarkable fact that the 20-oxo group present in (III; R″=H or acyl) fails to react with the Grignard reagent under the experimental conditions described. To our knowledge this is the first example recorded in the literature in which it has proved possible to cleave a 5α:6α-epoxy residue in a pregnan-20-one derivative by a Grignard reagent without prior protection of the 20-oxo function e.g. by ketal formation. In this respect the present process represents a novel and highly useful departure from prior art.

Oxidation of the 6β-methyl-3β:5α-diol (IV) into the 3-ketone (V) may be achieved by means of a chromic oxidising agent, such as chromium trioxide, in a solvent such as acetic acid or solvent mixture such as aqueous acetic acid-methylene dichloride or chromic acid in pyridine. In general the reaction proceeds at room temperature and is complete within a few hours.

The transformation of the saturated 3-ketone (V) into the unsaturated 6α-methyl-3-oxo-Δ⁴-steroid (I) may be accomplished by treating the 3-ketone (V) with a source of hydrogen ions in a lower aliphatic alcohol, such as ethanol. Hydrochloric acid, employed in minimal quantities, is the preferred source of hydrogen ions. The reaction proceeds readily at the reflux temperature of the lower aliphatic alcohol. Alternatively, the saturated 3-ketone (V) may be dehydrated to the corresponding 6β-methyl-3-oxo-Δ⁴-steriod by treatment with, for example, a very dilute solution of an alkali metal hydroxide such as potassium hydroxide in a lower aliphatic alcohol, and subsequently epimerised by methods established by prior art.

Following is a description by way of example of methods of carrying the invention into effect.

EXAMPLE 1

*6α-methyl-16α:17α(2′:2′-dimethyl-4′:5′-dioxolane)-progesterone (I; R=R′=Me)*

The starting material employed in this example was prepared as follows:

Perchloric acid (12 drops) was added to a stirred suspension of 3β:16α:17α-trihydroxypregn-5-en-20-one (7 g.) in acetone (210 ml.). After being stirred for 1 hour at room temperature, the mixture was set aside for 18 hours and then poured into water. The product was collected, washed, and purified by crystallisation from aqueous acetone, to give 16a:17α-(2′:2′-dimethyl-4′:5′-dioxolane)-3β-hydroxypregn-5-en-20-one in needles, M.P. 217° to 218° C., $[\alpha]_D^{22}$ −7.5° (c., 0.82 in chloroform).

A stirred solution of the foregoing compound (12 g.) in chloroform (300 ml.) at 0° C. was treated with anhydrous sodium acetate (1.5 g.) followed by 40% peracetic acid (15 ml.) added dropwise over 5 minutes. The mixture was stirred vigorously for 2 hours, allowed to reach room temperature, and then treated with water (200 ml.) and a further quantity of chloroform (200 ml.). The organic phase was washed with water, dilute aqeous sodium hydroxide, again with water and dired over calcium chloride. The residue obtained on removal of the solvent was crystallised from aqueous methanol to give 16α:17α - (2′:2′ - dimethyl-4′:5′-dioxolane)-5α:6α-epoxy-3β-hydroxypregnan-20-one in needles, M.P. 206.5° C., $[\alpha]_D^{20}$ −17° (c. 0.63 in chloroform).

The foregoing compound (12 g.) in pyridine (40 ml.) and acetic anhydride (20 ml.) was heated at 100° C. for 1 hour. The mixture was poured into water and the precipitated solid collected, washed, and purified from methanol. 3β - acetoxy-16α:17α-(2′:2′-dimethyl-4′:5′-dioxolane)-5α:6α-epoxypregnan-20-one formed plates, M.P. 216 to 217° C., $[\alpha]_D^{21}$ −12° (c., 0.9 in chloroform).

The foregoing 3β-acetoxy derivative (25 g.) in dry benzene (1 l.) was added to a Grignard reagent prepared from magnesium (25 g.), methyl iodide (72 ml.) and ether (425 ml.). Most of the ether was removed by distillation, after which the mixture was heated under reflux for 3 hours, cooled in ice, stirred, and treated with an excess of concentrated aqueous ammonium chloride. The organic phase was washed, dried, and the solvent removed. Purification of the residue from aqueous methanol gave 3β:5α-dihydroxy-16α:17α-(2′:2′-dimethyl-4′:5′-dioxolane)-6β-methylpregnan-20-one in needles, M.P. 208° C., $[\alpha]_D^{25}$ +26° (c. 0.75 in chloroform).

The foregoing compound (3.7 g.) in methylene dichloride (76 ml.) was mechanically shaken for 3½ hours with a solution of chromium trioxide (2.6 g.) in 80% acetic acid (76 ml.). After the addition of water (300 ml.) and methylene dichloride (300 ml.) the organic phase was separated, washed with water, aqueous sodium bicarbonate, then with water and dried. Evaporation of the solvent gave a residue which was crystallised from methanol. 16α:17α - (2′:2′-dimethyl-4′:5′-dioxolane)-5α-hydroxy-6β-methylpregnan-3:20-dione separated in needles, M.P. 259 to 261° C., $[\alpha]_D^{25}$ +43° (c. 0.95 in chloroform).

A solution of the foregoing compound (1 g.) in ethanol (25 ml.) was treated with concentrated hydrochloric acid (2 drops) and the mixture refluxed for 1 hours. The product was isolated with ether, and its solution in benzene passed through a short column of alumina. Elution with benzene gave a solid which was crystallised from aqueous methanol. 6α-methyl-16α:17α-(2′:2′-dimethyl-4′:5′-dioxolane) progesterone formed needles, M.P. 167° C., not depressed in admixture with an authentic specimen.

Alternatively, the saturated ketone (16α:17α-(2′:2′-dimethyl - 4′:5′-dioxolane)-5α-hydroxy-6β-methylpregnane-3:20-dione) may be dehydrated to 6β-methyl-16α:17α-(2′:2′-dimethyl-4′:5′-dioxolane) progesterone which may be subsequently epimersied. Thus, a solution of the saturated ketone (1 g.) in ethanol (20 ml.) containing potassium hydroxide (10 mg.) was heated under reflux for 45 minutes and then diluted with water. Crystallisation of the product from aqueous methanol gave 6β-methyl-16α:17α-(2′:2′-dimethyl-4′:5′-dioxolane) progesterone in needles, M.P. 198.5° C., $[\alpha]_D^{22}$ +93.5° (c., 0.7 in chloroform). A solution of this compound (1 g.) in ethanol (10 ml.) containing potassium hydroxide (9 mg.) was heated under reflux for 2 hours, then diluted with water. Purification of the product from aqueous methanol, followed by passage of its solution in benzene-light petroleum (40:60) through a short column of alumina gave material which crystallised from aqueous ethanol. 6α-methyl-16α:17α-(2′:2′-dimethyl-4′:5′-dioxolane) progesterone was obtained in needles, M.P. 167° C., not depressed in admixture with an authentic specimen.

EXAMPLE 2

*6α-methyl-16α:17α-(2′-phenyl-4′:5′-dioxolane) progesterone (I; R=C₆H₅; R′=H)*

The starting material employed in this example was prepared as follows:

Perchloric acid (5 drops) was added to a stirred suspension of 3β:16α:17α-trihydroxypregn-5-en-20-one (5 g.) in benzaldehyde. Stirring was continued for 4 hours, when the mixture was poured into water and the excess benzaldehyde removed by steam-distillation. The gummy residue was purified from aqueous ethanol to give 3β-hydroxy - 16α:17α - (2′-phenyl-4′:5′-dioxolane)pregn-5-en-20-one in soft felted needles, M.P. 200 to 201° C.

A solution of the foregoing compound (5 g.) in ether (300 ml.) was treated with a solution of monoperphthalic acid (5 g.) in ether (200 ml.). The mixture was allowed to stand for 18 hours. It was then washed with dilute aqueous sodium carbonate, water, dried, and the solvent removed. Crystallisation of the residue from aqueous ethanol gave 5α:6α-epoxy-3β-hydroxy-16α:17α-(2′-phenyl-4′:5′-dioxolane)pregnan-20-one.

The foregoing compound (5 g.) in benzene (400 ml.) was added to a Grignard reagent prepared from magnesium (3.4 g.), methyl iodide (10.2 ml.) and ether (100 ml.). The mixture was distilled until the vapour temperature reached 75° C., when heating under reflux was continued for 5 hours. The mixture was cooled, stirred, and the complex decomposed by the dropwise addition of aqueous ammonium chloride. The organic phase was separated, washed with dilute hydrochloric acid, then with water and dried. Removal of the solvent gave a residue which was crystallised from aqueous methanol. 3β:5α-dihydroxy - 6β - methyl-16α:17α-(2'-phenyl-4':5'-dioxolane)pregnan-20-one was obtained.

The foregoing compound (2 g.) in acetic acid (100 ml.) was treated for 18 hours with chromium trioxide (0.7 g.) in 80% acetic acid (50 ml.). The mixture was then diluted with water, the solids collected, and crystallised from aqueous ethanol. 5α - hydroxy-6β-methyl-16α:17α-(2'-phenyl-4':5'-dioxolane)pregnan-3:20-dione was obtained.

The foregoing compound (2 g.) in ethanol (100 ml.) was treated with 5 drops of concentrated hydrochloric acid and the mixture heated under reflux for 1 hour. The product was isolated by the addition of water and extraction with ether. Crystallisation from acetone-hexane gave 6α-methyl-16α:17α-(2'-phenyl-4':5'-dioxolane) progesterone in needles, M.P. 205 to 207° C., not depressed in admixture with an authentic specimen.

We claim:
1. A process for the preparation of cyclic acetals and ketals of the 6α-methylpregnane series having the general formula

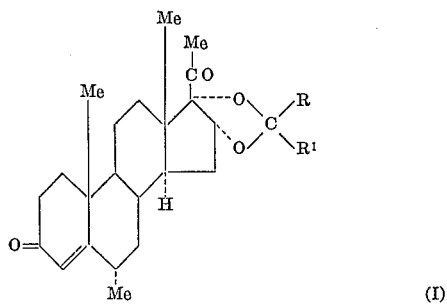

(I)

(where R is selected from the group consisting of hydrogen and alkyl and aryl and R' is selected from the group consisting of alkyl and aryl) which process comprises oxidising a steroid having the general formula

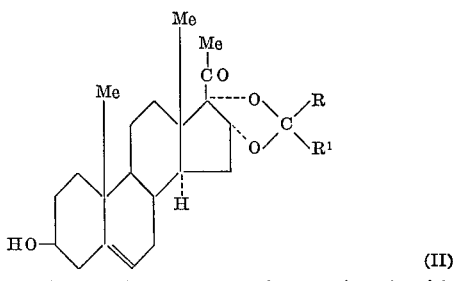

(II)

(where R and R' have the same meaning as above) with an organic peracid to form the corresponding 5α:6α-epoxide

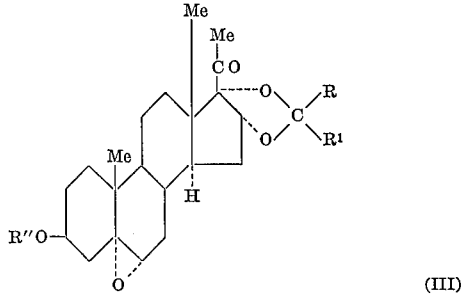

(III)

(where R''=H and R and R' have the same meaning as above), reacting said 5α:6α-epoxide with a methyl magnesium halide to give a 6β-methyl-3β:5α-diol having the formula

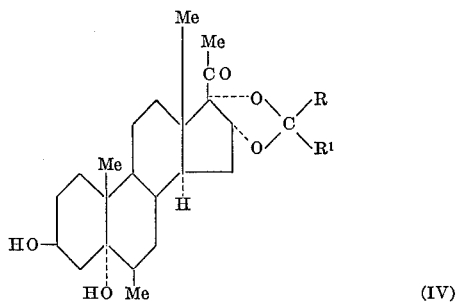

(IV)

(where R and R' have the same meaning as above), oxidising said 6β-methyl-3β:5α-diol by means of a chromic oxidising agent to form a 6β-methyl-3-ketone having the formula

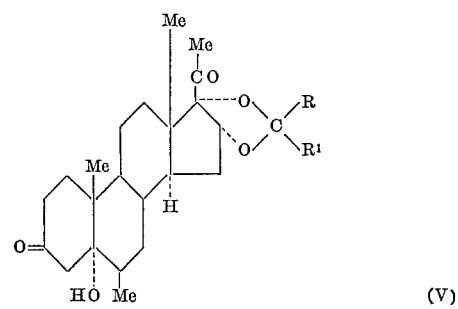

(V)

(where R and R' have the same meaning as above) and dehydrating and epimerising said 6β-methyl-3-ketone by treatment with a source of hydrogen ions in a lower aliphatic alcohol to provide the corresponding 6α-methyl-Δ⁴ compound (I).

2. A process as claimed in claim 1 wherein the organic peracid is peracetic acid.
3. A process as claimed in claim 1 wherein the organic peracid is monoperphthalic acid.
4. A process as claimed in claim 1 wherein a solution of the 5α:6α-epoxide in benzene is added to a solution of methylmagnesium iodide in ether.
5. A process as claimed in claim 1 wherein the 6β-methyl-3β:5α-diol is oxidised with chromium trioxide in acetic acid.
6. A process as claimed in claim 1 wherein the dehydration and epimerisation is effected by treatment with hydrochloric acid in ethanol.
7. 3β - hydroxy - 16α:17α - (2' - phenyl - 4':5' - dioxolane)pregn-5-en-20-one.
8. 16α:17α - (2':2' - dimethyl - 4':5' - dioxolane)-5α:6α-epoxy-3β-hydroxypregnan-20-one.
9. 3β - acetoxy - 16α:17α - (2':2' - dimethyl - 4':5'-dioxolane)-5α:6α-epoxypregnan-20-one.
10. 3β:5α - dihydroxy - 16α:17α - (2':2' - dimethyl-4':5'-dioxolane)-6β-methylpregnan-20-one.
11. A process for the preparation of a 6-methyl steroid of the 20-ketopregnane series by Grignard reaction of a corresponding 5α:6α-epoxide without protection of the 20-keto group, comprising: reacting a 5α:6α-epoxide having the formula

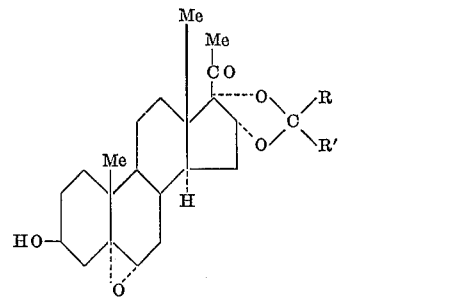

where R is selected from the group consisting of hydrogen, alkyl and aryl and R' is selected from the group consisting of alkyl and aryl, with a methyl magnesium halide to give a 6β-methyl-3β:5α-diol having the formula

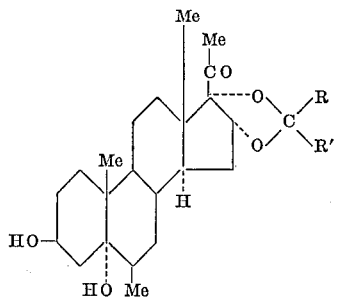

where R and R' have the same meaning as above.

12. The process of claim 11 including the further steps of oxidizing the 6β-methyl-3β,5α-diol with chromic acid to provide the corresponding 6β-methyl-3-ketone and treating said 6β-methyl-3-ketone with an alkali metal hydroxide in a lower aliphatic alcohol to effect dehydration and epimerizing the resultant compound to thereby provide the corresponding 6α-methyl-3-keto-$\Delta^4$ compound.

References Cited by the Examiner

David et al.: J. Pharmacol. 9, 929–34 (1957).
Ringold et al.: J. Org. Chem. 22, 99–100 (1957).
Ringold et al.: J.A.C.S. 81, 3712–16 (1959).

LEWIS GOTTS, *Primary Examiner.*

LESLIE H. GASTON, MORRIS LIEBMAN, *Examiners.*

M. L. WILLIAMS, E. L. ROBERTS, *Assistant Examiners.*